United States Patent Office 3,522,636
Patented Aug. 4, 1970

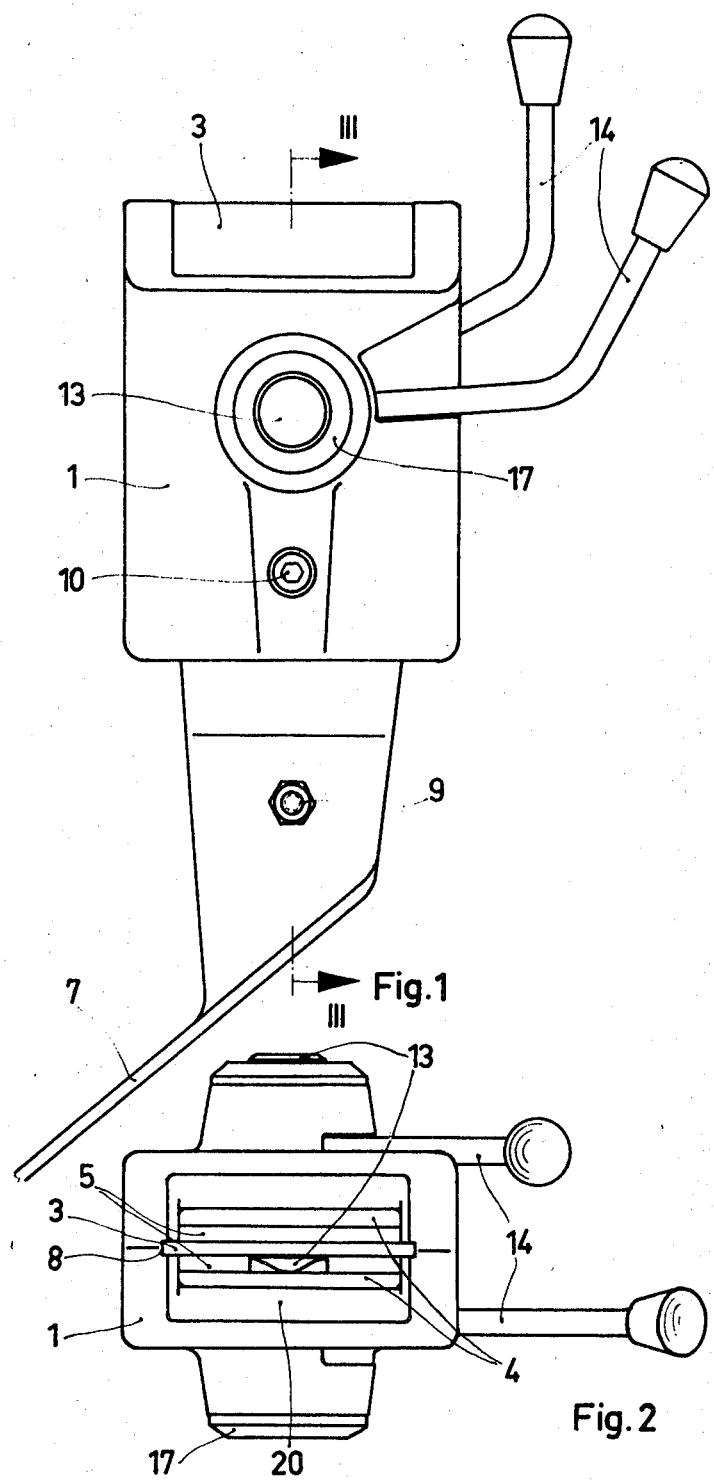

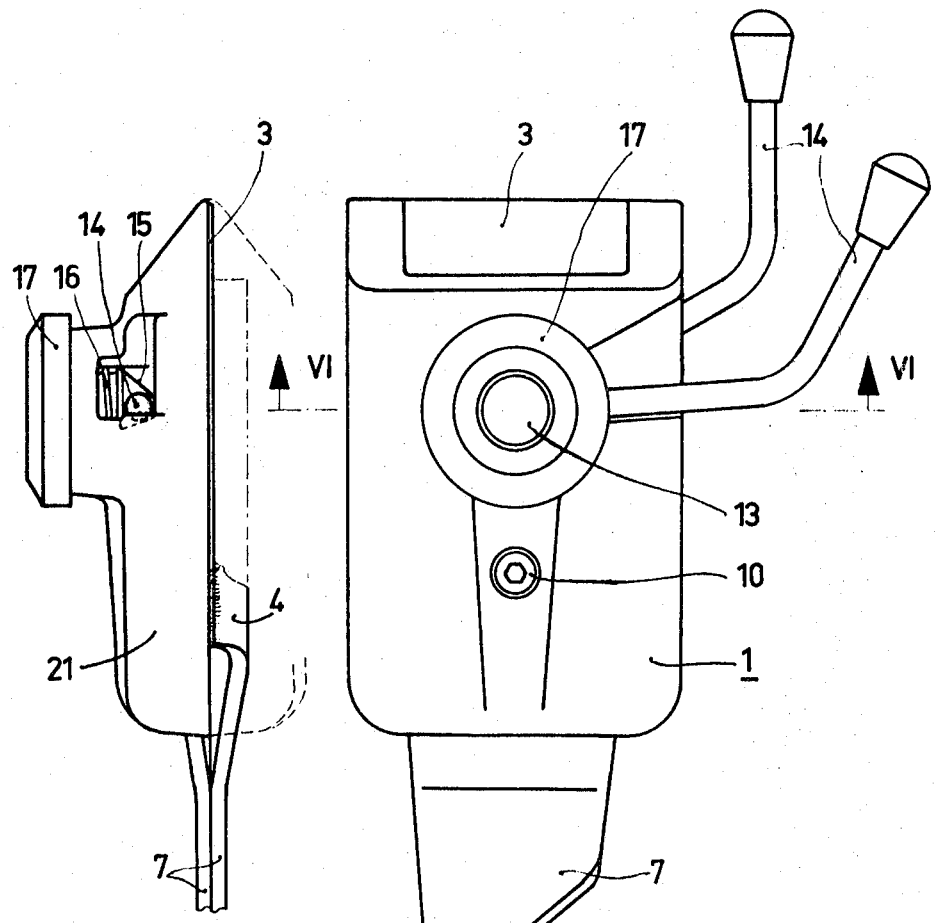
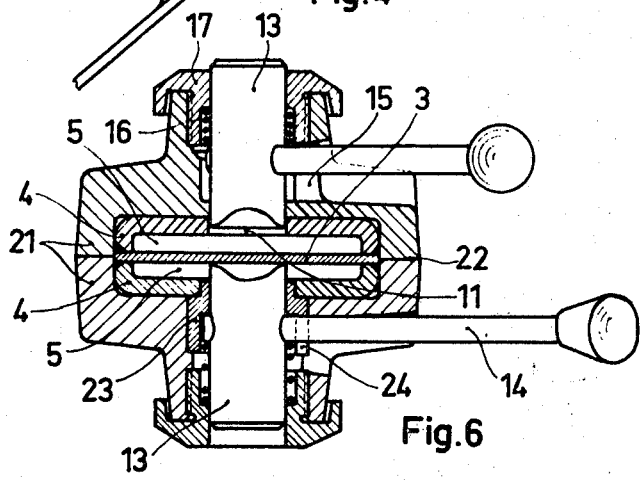
Fig. 5  Fig. 4
Fig. 6

3,522,636
LOCK OR BUCKLE FOR VEHICLE SAFETY BELTS
Wolf-Dieter Klink, Staufenstr. 8, Lindach,
near Schwabisch Gmund, Germany
Filed Jan. 19, 1968, Ser. No. 700,674
Claims priority, application Germany, Jan. 23, 1967,
1,580,125
Int. Cl. A44b 11/25, 21/00
U.S. Cl. 24—73                                   23 Claims

ABSTRACT OF THE DISCLOSURE

Buckle for vehicle safety belts rigidly connectible to the floor of a vehicle, comprising a single housing, and a pair of similar mutually independent locking systems located within said single housing for lockingly retaining respective sliders of a pair of safety belts therewithin.

My invention relates to lock or buckle for vehicle safety belts, which is directly or indirectly rigidly connected to the floor of the vehicle or, as in the case of rear-drive motor vehicles, to the upper surface of the tunnel through which the transmission shaft of the vehicle extends.

In vehicles, particularly motor vehicles, having seats separated from one another, as in the case of so-called sports cars, it is conventional to provide in the vicinity of the transmission shaft tunnel, two locks or buckles for the safety belts, respectively of the driver and of a passenger located adjacent the driver, which are mutually independent. In addition to requiring a duplicate construction of the locking means for the sliders of the safety belts, such an arrangement calls for a relatively high cost for the individual locks or buckles.

It is accordingly an object of my invention to provide lock or buckle for vehicle safety belts for seats located separate from one another which can be produced at greatly reduced cost.

With the foregoing and other objects in view, I provide in accordance with my invention, lock or buckle for vehicle safety belts comprising a pair of similar mutually independent locking systems located in a common housing. Both locking systems are advantageously separated from one another by a wall or partition subdividing the inner space of the common housing and extending in substantially the same direction as that in which the slider at the end of the safety belts is inserted into the locking systems. Two locking bolts or pins are disposed transversely to the partition or separating wall, are displaceable in opposite axial direction and, in the locking position, have a respective end surface thereof abutting against different sides of the separating wall under the biasing action of a spring.

In accordance with one embodiment of my invention, the guide bearings for the locking pins and adjusting surfaces for releasing the locking pins are formed in the housing proper.

In accordance with another embodiment of the invention, if the housing is made of a material having insufficient durability for trouble-free guidance of the locking pins, guide sleeve or bushings for the locking pins are inserted in the housing, the adjusting surfaces for releasing the locking pins being formed in the guide sleeves, if desired.

According to further features of my invention, slots are formed in the housing for receiving the safety belt sliders insertable therein, the slots being defined on the outside thereof by guide rails disposed parallel to the separating wall, the rails extending out of the housing as fastening or attachment rails and having edges extending parallel to the direction of insertion of the sliders into the slots, the edges being connected to one another and/or to the separating wall, for example by welding. The guide rails have a generally U-shaped profile within the lock or buckle housing, the respective opposite legs of the U-shaped profiles of the guide rails being connected to one another and/or to the separating wall at the free ends thereof. The length of the legs of the U-shaped profiles of the guide rails corresponds suitably to the thickness of the respective slider insertable within the respective locking system. In the simplest embodiment of the lock or buckle of my invention, both guide rails form the common lock housing.

As an additional feature of the invention, the guide rails are formed with bores wherein, if desired, bearing sleeves or bushings are inserted or fastened, serving as bearings for the locking pins.

According to yet another feature of the invention, one embodiment of the housing is formed of two shells consisting of plastic or metallic material joined together advantageously by adhesive or by suitable form-locking means, the junction thereof being disposed in the plane of the separating wall. It is within the scope of the invention, however, to construct the housing of one integral part, for example as a casting, which is slid onto the structural entity formed by the guide rails and the separating wall, and is fixed in its predetermined position by any suitable means.

In accordance with concomitant features of my invention, the housing is formed at least partly of elastic plastic material in order to avoid damage caused when the motor vehicle is braked sharply or is involved in an accident. For example, a metallic housing is provided with a suitably thick covering of elastic plastic material. In many cases, it can be advantageous for the housing to be formed of plastic material reinforced by glass fibers.

In accordance with an added feature of my invention which facilitates the insertion of the safety belt slider into the lock or buckle of the invention, the housing is provided with a funnel-shaped passage having surfaces running together to the inlet slots. It is thereby advantageous for the separating wall to project from the housing into the funnel-shaped insertion passage.

Other features which are considered as characteristic for the invention are set forth in the appended claims.

Although the invention is illustrated and described herein as embodied in lock or buckle for vehicle safety belts, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a front elevational view of one embodiment of the lock or buckle of my invention having a one-piece housing;

FIG. 2 is a top plan view of FIG. 1;

FIG. 4 is a front elevational view of another embodiment of the lock or buckle of my invention having a two-piece housing;

FIG. 5 is a partial side elevational view as seen from the right-hand side of FIG. 4.

FIG. 6 is a cross sectional view taken along the line VI—VI in FIG. 4 in the direction of the arrows.

Figure 3:
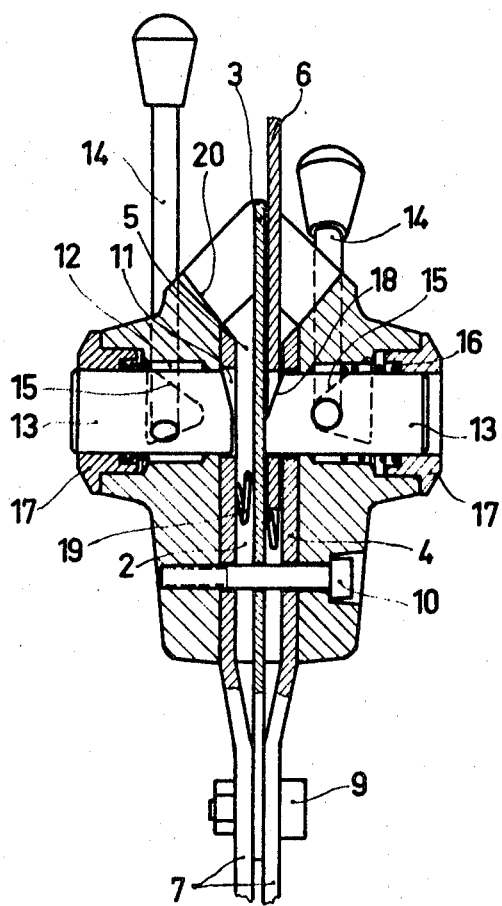
FIG. 3 is a longitudinal sectional view taken along the line III—III in FIG. 1 in the direction of the arrows.

Referring now to the drawings, and first particularly to FIGS. 1 to 3 thereof, there is shown a common one-piece housing 1, for example cast of a suitable metal or plastic material, wherein two locking systems independent of one another are provided. The housing 1 is formed with an opening 2 extending therethrough, wherein a structural member comprising a dividing wall or partition 3 and guide rails 4 is disposed, an insertion slot 5 for receiving a slider 6 that is secured to the end of a flexible strap or web of a safety belt being thus defined between the partition 3 and each of the guide rails 4. The guide rails 4 extend out of the housing 1, the outer extensions thereof forming fastening or mounting brackets 7 for fixing the lock to a suitable support such as the floor or transmission shaft tunnel of a motor vehicle. The partition 3 is retained in grooves 8 (FIG. 2) formed in the housing 1 and is connected by a screw 9 (FIGS. 1 and 3) or similar machine part or by welding with the fastening brackets 7. The position of the housing 2 on the guide rails 4 is fixed by a screw 10. The guide rails 4, which define the outer limit of the insertion slots 5, and the housing 1 are formed with coaxial bores 11 and 12 wherein locking bolts or pins 13 are mounted for axial displacement. Manual actuating levers 14 are connected to the locking pins 13. Adjusting surfaces 15 extending obliquely or inclined to the respective locking pin axes are associated with the actuating levers 14, and locking springs 16 coaxially surrounding the respective locking pins 13 abut against the actuating levers 14 at one end thereof and against the guide sleeves or bushings 17 at the other end thereof forming counter-bearings therefor. In the rest position or unlocked state of the buckle of my invention, the locking pins 13 are in the position shown at the right-hand side of FIG. 3 due to the biasing action of the spring 16 which forces the inner end surface of the respective locking pin 13 against the partition 3. As seen in FIG. 3, the inner end surfaces of the locking pins 3 are formed with an inclined surface portion 18 which facilitates the insertion of the slider 6. The housing 1 at the entrance or inlet to the locking systems of the buckle of my invention, through which the slider 6 is inserted, is funnel-shaped in that surfaces 20 of the housing 1 converge toward the insert slots 5 formed therein, thereby further facilitating insertion of the slider 6.

When a slider 6 is inserted into a slot 5, the locking pin 13, due to its inclined end surface portion 18, is displaced outwardly in the axial direction thereof against the biasing action of the spring 16. Then, as an opening (not shown) formed in the slider 6 and having a diameter substantially corresponding to the diameter of the locking pin 13 comes into registry with the locking pin 13 when the slider 6 is slid further into the slot 5, the locking pin 13 is forced back by the action of the spring 16 so that its comes to rest within the non-illustrated opening formed in the slider 6 so as to thereby bolt the respective locking system of the buckle. As the slider 6 is being inserted into the insertion slot 5, an ejection spring 19 located to the rear of the insertion slot 5 is subjected to compressive stress.

The unbolting or opening of the respective lock system is effected by swinging or turning the manual releasing lever 14 about the axis of the locking pin 13 while sliding the releasing lever 14 along the adjusting surface 15 so that the locking pin 13 is caused to move outwardly away from the insertion slot 5 as shown on the left-hand side of FIG. 3. The slider 6, not shown on the left-hand side of FIG. 3, is accordingly released when the respective locking pin 13 is moved out of the non-illustrated opening formed in the slider 6, and is expelled from the respective slot 5 under the expanding action of the previously compressed ejection spring 19.

In the embodiment of the buckle of my invention shown in FIGS. 4 to 6, parts corresponding to those of the embodiment of FIGS. 1 to 3 are identified by the same reference numerals. The housing 1 of the embodiment of FIGS. 4 to 6 is formed of two housing shells 21 (FIG. 6), which are constructed of metal or of suitable plastic material, and have a common junction 22 extending in the plane in which the partition 3 is disposed. The guide rails 4 of the embodiment of FIGS. 4 to 6 have a similar U-shaped cross section as in the embodiment of FIGS. 1 to 3, the respective oppositely directed legs of the U-shaped profiles of both guide rails 4 being welded at their free ends either to one another or to the partition 3.

In the upper half of FIG. 6, the locking pin 13, in a manner similar to the embodiment of FIGS. 1 to 3, extends through a bore 11 formed in the guide rail 4 and into the bearing bushing 17. The adjusting surface 15 for releasing the respective locking system is formed in the upper housing shell half 21. In the lower half of FIG. 6, a bearing bushing 23 is inserted within the shell half 21. An adjusting surface 24 is formed in the bearing bushing 23 which forces the locking pin 13 to be displaced axially when the manual actuating lever 14 is swung about the axis of the locking pin 13.

Figure 7:
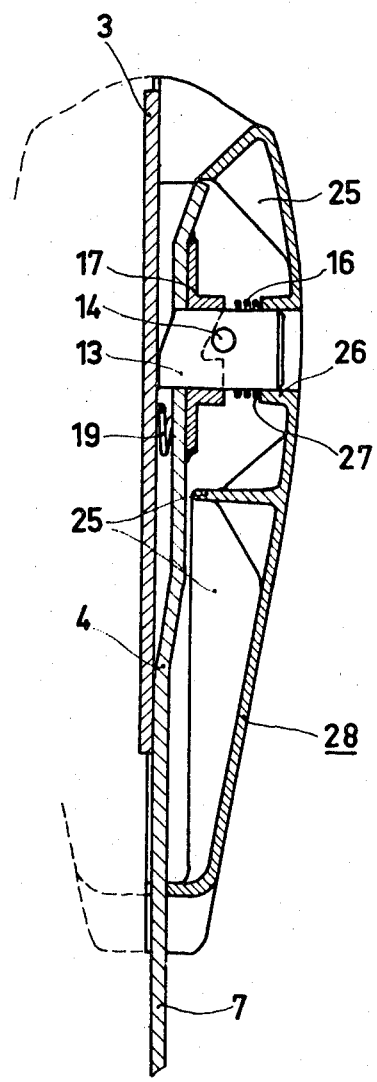
FIG. 7 is a partial longitudinal sectional view of yet another embodiment of the lock or buckle of my invention having a housing formed of hollow shells.

The housing of the embodiment of my invention shown in FIG. 7 is constructed in the form of two hollow shells 28. The hollow shells 28 are provided with reinforcing ribs 25 on the inner surface thereof and, in the vicinity of the locking pins 13, with a cylindrical attachment 26 having an end face 27 serving as an abutment surface or counter-bearing for a spring 16 coaxially surrounding the locking pin 13. Those parts shown in FIG. 7 which correspond to similar parts in the embodiments of FIGS. 1 to 6 are identified by correspondingly similar reference numerals.

I claim:

1. Buckle for vehicle safety belts rigidly connectible to the floor of a vehicle, comprising a single housing, a pair of similar mutually independent locking systems located within said single housing for lockingly retaining respective sliders of a pair of safety belts therewithin, a partition subdividing the hollow interior of said single housing into two chambers, each accommodating one of said locking systems, inlet means formed in said single housing for inserting respective sliders therethrough in a given direction into said locking systems, said partition extending substantially in said given direction, and a pair of locking pins disposed transversely to said partition and displaceable in opposite axial directions, said locking pins having a respective end surface thereof abutting against different sides of said partition, in the locking position of said locking pins.

2. Buckle according to claim 1, including guide bearings for said locking pins disposed in said housing.

3. Buckle according to claim 1, including adjusting surfaces for releasing said locking pins from locking position thereof being formed in said housing.

4. Buckle according to claim 1, including guide bushings for said locking pins being inserted in said housing.

5. Buckle according to claim 4, including adjusting surfaces for releasing said locking pins from locking position thereof being formed in said guide bushings.

6. Buckle according to claim 1, including a pair of guide rails located parallel to and on opposite sides of said partition, said guide rails being formed with bores providing bearing means for said locking pins.

7. Buckle according to claim 1, including a pair of guide rails located parallel to and on opposite sides of said partition, and bearing bushings for said locking pins located at said guide rails respectively.

8. Buckle according to claim 1, wherein said single housing is constructed of two similar shells formed of material selected from the group consisting of metal and plastic materials, said two shells having a junction located in a plane in which said partition is disposed.

9. Buckle according to claim 8, wherein said housing shells are connected to one another with adhesive.

10. Buckle according to claim 8, wherein said housing shells are connected to one another by mutual form-locking means.

11. Buckle according to claim 1, wherein said housing is of one-piece construction.

12. Buckle according to claim 11, wherein said one-piece housing is a casting.

13. Buckle according to claim 1, wherein said housing is formed at least partly of elastic plastic material.

14. Buckle according to claim 1, wherein said housing is formed of plastic material reinforced with glass fibers.

15. Buckle according to claim 1, wherein said single housing is formed of two hollow shells provided with reinforcing ribs on the inner surface thereof.

16. Buckle according to claim 1, said inlet means being funnel-shaped, said housing at said inlet means having surfaces converging to an insertion slot adapted to receive respective sliders therein.

17. Buckle according to claim 16, wherein said partition projects into the funnel-shaped inlet means of said housing.

18. Buckle for vehicle safety belts rigidly connectible to the floor of a vehicle, comprising a single housing, a pair of similar mutually independent locking systems to cated within said single housing for lockingly retaining respective sliders of a pair of safety belts therewithin, a partition subdividing the hollow interior of said single housing into two chambers, each accommodating one of said locking systems, inlet means formed in said single housing for inserting respective sliders therethrough in a given direction into said locking systems, said partition extending substantially in said given direction, and a pair of guide rails located parallel to and on opposite sides of said partition, said guide rails at one end defining with said partition at the outside of said housing, respective insertion slots for the sliders, and extending out of said housing at the other end thereof for attachment to a support.

19. Buckle according to claim 18, wherein the edges of said guide rails extend substantially parallel to said given insertion direction of the sliders, and said respective edges are connected to one another.

20. Buckle according to claim 18, wherein the edges of said guide rails extend substantially parallel to said given insertion direction of the sliders, and said edges are connected to said partition.

21. Buckle according to claim 18, wherein said guide rails have a substantially U-shaped cross section in the vicinity of said locking systems, respective free ends of the legs of said U-shaped cross sections of said guide rails being connected to one another.

22. Buckle according to claim 18, wherein said guide rails have a substantially U-shaped cross section in the vicinity of said locking systems, the free ends of the legs of said U-shaped cross sections of said guide rails being connected to said partition.

23. Buckle according to claim 18, wherein said guide rails have a substantially U-shaped cross section in the vicinity of said locking systems, the legs of said U-shaped cross section corresponding to the thickness of the sliders insertable into said insertion slots.

References Cited

UNITED STATES PATENTS

| | | |
|---|---|---|
| 1,266,680 | 5/1918 | Hall. |
| 2,635,317 | 4/1953 | Harley. |
| 2,903,774 | 9/1959 | Harley. |
| 3,034,596 | 5/1962 | Twaits _____ 24—205.17 X |
| 3,277,545 | 10/1966 | Martin. |

FOREIGN PATENTS

| | | |
|---|---|---|
| 1,019,556 | 1/1953 | France. |
| 1,252,726 | 12/1960 | France. |

BERNARD A. GELAK, Primary Examiner

U.S. Cl. X.R.
24—205.17, 230